United States Patent Office 3,584,094
Patented June 8, 1971

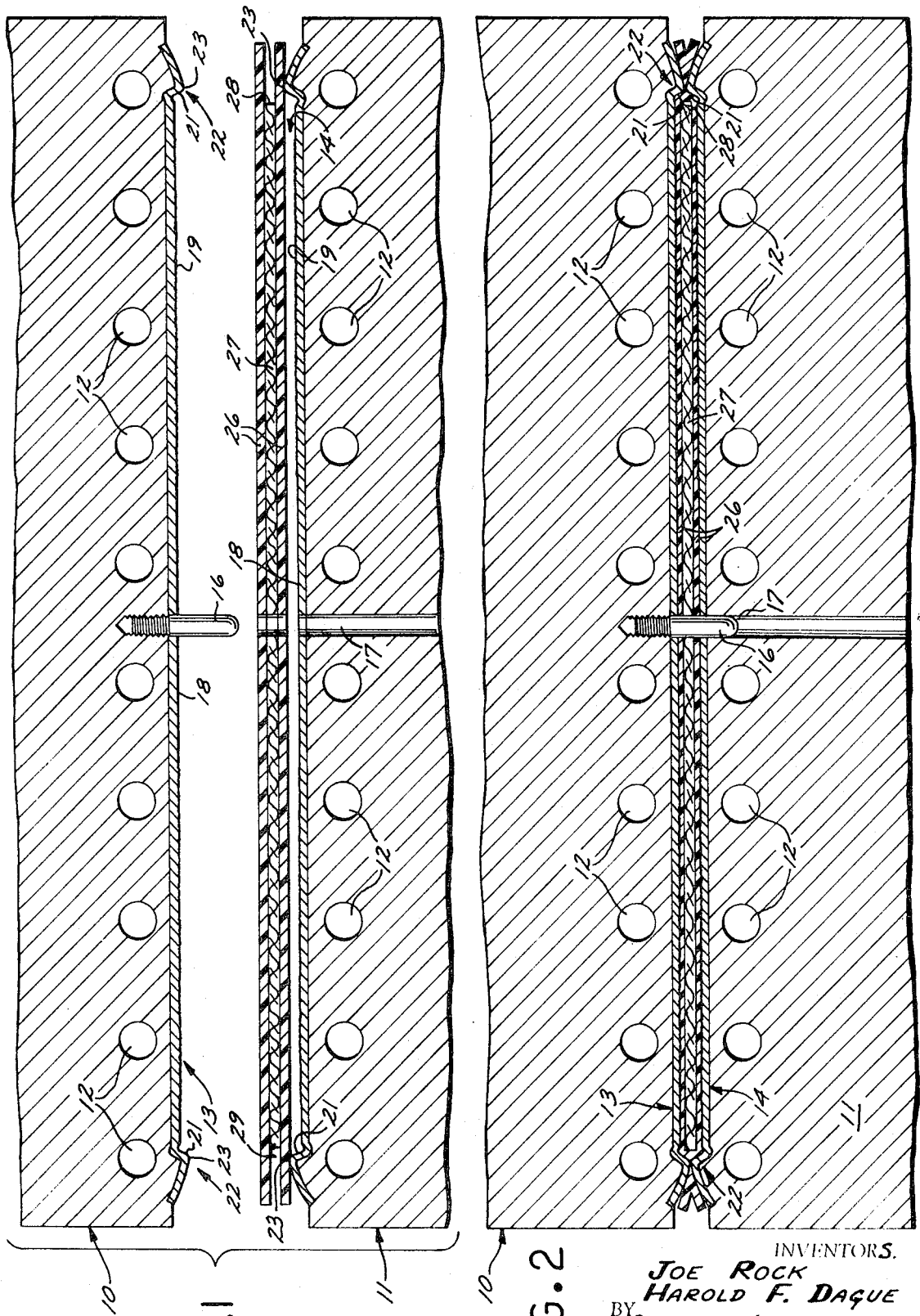

3,584,094
METHOD OF MAKING PICTURE-TYPE PHONOGRAPH RECORDS
Joe Rock, Hollywood, and Harold F. Dague, Costa Mesa, Calif., assignors to Pic-Tur Records, Inc., Las Vegas, Nev., % McNamee & Rittenhouse
Filed Jan. 8, 1969, Ser. No. 789,788
Int. Cl. B29d 17/00
U.S. Cl. 264—107                                    14 Claims

ABSTRACT OF THE DISCLOSURE

A disc of cardboard or paperboard having a thickness in a predetermined range is printed on both sides with pictures, printing, etc. Such paperboard disc is sandwiched between two corresponding sheets of transparent thermoplastic synthetic resin. The synthetic resin is preheated to a predetermined temperature, and the indicated sandwich is placed between the matrix elements or "stampers" of a record press or mold. The thicknesses of the resin sheets, and the depth of the mold cavity, are correlated to the thickness of the paperboard and other factors in such manner that very little radial-outward flow of plastic results when heat and pressure are applied by the mold or press. The method further comprises employing rim means at the matrix edges to create effective seals between the peripheral edges of the plastic sheets, and to effect radial-inward flow of plastic from the rim means in order to aid in filling the void adjacent the peripheral edge of the paperboard disc. The heat and pressure employed in the molding operation are preferably higher than conventionally employed to make records not of the picture type.

BACKGROUND OF THE INVENTION

The field of the invention

This invention relates to the field of forming decorative phonograph records wherein pictures, printing, etc., are located beneath the record grooves instead of merely in the ungrooved center portion of the record.

Description of the prior art

There has been much activity relating to methods of forming decorative "picture" phonograph records. The activity has been directed toward the solution of numerous problems, including (among others) prevention of explosion or rupture of the decorative picture, achievement of a proper seal at the edge of the record, prevention of warping and waving, elimination of voids, achievement of the desired degree of clarity of the plastic through which the picture is viewed, economy of production, etc. Patents known to applicants and relating to the field of picture-phonograph record formation, or similar fields, include the following: 862,407, 897,254, 1,931,287, 2,511,708, 2,528,610, 2,528,611, 2,587,427, 2,588,958, 2,606,851, 2,985,058, 3,050,433, 3,052,586, 3,102,730 and 3,247,298.

Despite the considerable activity in the indicated field, no prior-art worker known to applicant has been able to mass-produce a commercially satisfactory picture-phonograph record either of the long-playing 12-inch type or of other types. More particularly, the prior art has not achieved a flat, highly transparent, perfectly bonded, void-free picture-phonograph record wherein the edges are perfectly formed and sealed and wherein the picture may be formed on cardboard or paperboard, the latter being distinguished from metal, etc.

SUMMARY OF THE INVENTION

Applicants have achieved a commercially satisfactory mass-producible picture-phonograph record made of synthetic resin surface sheets and a decorative cardboard central disc. They have done this by discovering how to prevent excessive radial-outward flow of the synthetic resin surface material despite the presence of great pressure and substantial heat, by discovering how to fill in the void adjacent the periphery of the decorative cardboard disc (without relying upon excessive outward flow of resin from the grooved area), and by discovering how to achieve practical and effective edge seals and edge trimming. More particularly, applicants have discovered that, if the thicknesses of the sheets of synthetic resin are correlated to the thickness of the cardboard center, and also to the depth of the mold cavity, in a predetermined manner which insures that excess resin will serve primarily to fill the grooves of the matrix or stamper instead of flowing radially outwardly in an excessive amount, and if the rim of each matrix or stamper is so constructed and related to the peripheral edge portions of the cardboard and resin sheets that effective and void-free pressure bonds will result regardless of minimum radial-outward flow of resin from the grooved region, than it is possible to mass-produce the picture-phonograph record while using only a core formed of cardboard. To minimize press time, the heat and pressure employed are higher than is conventional for non-picture records.

BRIEF DESCRIPTION OF THE DRAWING

FIG. 1 is a schematic representation of a record press or mold prior to closing thereof and containing the synthetic resin and cardboard sandwich from which the record is manufactured, it being emphasized that the elements in FIG. 1 (and also FIG. 2) are not necessarily in proportion since to show the layers in proportion would cause them to appear excessively thin in the patent drawings; and FIG. 2 is a view corresponding to FIG. 1 but illustrating the condition of the parts after closing the press and substantial completion of the record-manufacturing operation.

DESCRIPTION OF THE PREFERRED EMBODIMENT

It is a major feature of the present method that it may, with certain important exceptions indicated hereinafter, be performed with apparatus which is conventionally employed in the record industry for manufacture of conventional records, thus effecting a great saving in equipment cost. Such conventional records are manufactured from masses of heated plastic which are initially located at the central portions of the matrices and then are extruded radially outwardly in response to closing of the press.

Referring to FIGS. 1 and 2, there is shown (schematically only) a book-type record press incorporating upper and lower backup mold or die elements 10 and 11 having a multiplicity of passages 12 therethrough in order to receive steam, when it is desired to heat the molds, and cooling water when it is desired to cool the same. Suitably mounted (by mounting means, not shown) on the opposed surfaces of elements 10 and 11 are upper and lower matrix elements 13 and 14, respectively. Such elements are conventionally referred to in the trade as "stampers." Except for the fact that one of the die or mold elements has associated therewith a central pin 16 adapted to be received within a corresponding central bore 17 in the other element, the matrix or stamper elements 13 and 14 are identical to each other (except, of course, that the grooves thereof represent different sounds) and are symmetrical about a horizontal plane passing therebetween.

The present method employs matrices or stampers 13–14 (and associated mold or die portions) which are adapted to apply uniform bonding and molding pressure to the resin and cardboard elements (described hereinafter) which are disposed therebetween. Thus, the central portions 18 of the respective matrices 13 and 14 lie in substantially the same planes as do the grooved portions 19 thereof. This is to be contrasted with conventional practice in the record industry, since the central portions of conventional record molds or dies are inwardly protuberant in order that the center disc (radially inwardly of the grooved portions) of the resulting record will be relatively thin. The purpose of this relatively thin center of a conventional record is to effect radial-outward extrusion of the plastic, and also to conserve material.

It is to be understood that in conventional record presses the matrices or stampers do not extend inwardly to the pin 16 or hole 17, but instead terminate short distances inwardly of grooved portions 19. Each die or mold then has a removable center plug which aids in mounting the associated matrix. The present method may use conventional matrices and conventional molds or dies, changing only such removable center plug, which is relatively inexpensive. As indicated above, each such center plug is modified to make the surface thereof substantially coplanar with the exposed surface of the corresponding grooved portion 19.

The remaining sections of the matrices 13 and 14 employed while practicing the present method include rim portions 22 located radially outwardly of grooved portions 19. Such rim portions have radially-inwardly divergent inclined or bevel regions 21 which extend outwardly to circles of contact 23. The inclined regions 21 and circles of contact 23 preferably are formed on coined edges or rims. The "circles of contact" are the regions where the coined edges or rims are tangential to horizontal planes. Such circles come into substantial contact with each other when the press is closed to the position of FIG. 2. The expression "substantial contact" is employed because, conventionally, a thin region of resin still remains between the circles of contact after the press closes, necessitating a simple trimming step indicated hereinafter.

The elements which are placed between the upper and lower matrix or stamper sections 13 and 14, and of which the record is formed, are in a sandwich having outer sheets 26 of highly transparent thermoplastic synthetic resin, and a central disc or core 27 of cardboard.

Each resin sheet 26 has a diameter which is at least substantially equal to the diameters of the circles of contact 23 of rims 22, and is preferably considerably larger than such contact-circle diameters (as indicated in the drawings).

The thickness of each resin sheet 25 is correlated to the depth of the mold cavity formed between stampers 13 and 14, and to the thickness of the cardboard disc 27, in a critical manner such that there will be sufficient material to fill the grooves in grooved portions 19 of the stampers, but insufficient to effect excessive radial-outward flow of plastic when the press closes. The prevention of excessive radial-outward flow of plastic is important to the present method, as indicated above, since excessive outward flow causes rupture of the cardboard 27. On the other hand, it is emphasized that, because cardboard 27 is used instead of merely unbacked paper, a small amount of radial-outward flow of plastic is permissible and will not cause rupture or tearing of the cardboard. Such small amount may be about 1/16 inch or less.

Applicants have found that the over-all thickness of the sandwich 26–27 should be approximately 0.010 inch greater than the distance between upper and lower matrix portions 18, or upper and lower matrix portions 19. The word "approximately" is employed because some tolerance is sometimes permissible, namely, plus or minus about 0.003 inch. Such distances between the upper and lower matrix portions refer to the distances present when the press is closed as shown in FIG. 2. With the indicated "differential" of from about 0.007 inch to about 0.013 inch, closing of the press will cause the record grooves in grooved portions 19 to be filled properly, yet radial-outward flow of the plastic or resin 26 will be kept within the close limits indicated above, so that the cardboard core 27 will not tear or rupture.

Each resin disc 26 has, in accordance with the present method, a thickness in the range of about 0.020 inch to about 0.025 inch. The cardboard center disc 17 has a thickness in the range of about 0.015 inch to 0.040 inch. The over-all thickness of the resulting phonograph record is varied primarily by changing the thickness of the cardboard core, not by changing substantially the thickness of the resin sheets.

As an example, let it be assumed that the thickness of the finished record (which corresponds to the distance between the matrix portions 18, or matrix portions 19, when the press is closed as shown in FIG. 2) is to be about 0.070 inch. Let it also be assumed that the thickness of each resin sheet 25 is 0.020 inch. Accordingly, the thickness of the cardboard center is caused to be 0.040 inch. The 0.080 inch combined thicknesses of the resin sheets and cardboard center is 0.010 inch greater than the thickness (0.070 inch) of the finished record, so that the necessary "differential" is provided.

The above is to be contrasted with prior-art methods wherein the thicknesses of the elements forming the record combine to be much greater than the thickness of the finished record, and wherein very substantial radial-outward extrusion resulted upon closing of the record press. Such outward extrusion necessitated the use of various types of core materials, such as metal, or use of various treated laminates, as the center core.

If the "differential" in the present method is more than about 0.003 inch less than 0.010 inch, the grooves in grooved portions 19 will not be properly filled (this assuming that the depths of the grooves are on the order of 0.0025 inch as is the case with conventional long-playing phonograph records). On the other hand, if the "differential" is more than about 0.003 inch greater than 0.010 inch, the cardboard center will frequently be split or ruptured as indicated above.

Each resin sheet 26 is preferably formed of clear polyvinylchloride acetate resin. The vinyl acetate content should be in the range of 13 to 17 percent. Such resin is, as well known in the record industry, compounded with stabilizers, waxes and processing aids. The resin is then calendered into sheets which are, as indicated above, in the range of about 0.020 inch thick to about 0.025 inch thick. The resulting glass-clear sheets are cut into squares or circles which should have (when the resulting record is to be 12 inches in diameter) diameters on the order of 12½ inch. In any event, the diameters of the resin sheets should be (as stated above) at least substantially equal to the 12-inch (approximately) diameters of the circles of contact 23.

The center disc 27 is a cardboard or paperboard stock, for example one known in the trade as "Carolina," which has the above-indicated thickness. The stock is, as previously stated, decoratively printed on both sides. Because many printers will not print on stock thicker than 0.020 inch, the cardboard center may comprise two surface-coated sheets each 0.020 inch in thickness and each printed on the coated side. Such sheets are then laminated together to result in an over-all cardboard thickness of 0.040 inch. The coating on the printed surface of the stock is adapted to improve reception of the printing ink.

Where a thinner record is desired, such as 0.050 inch, the cardboard disc need be only 0.020 inch thick, and need not be laminated. The center core may also comprise unprinted cardboard onto which printed sheets of paper are laminated.

The cardboard may also be unprinted, but surfaced with printed paper.

The diameter of the cardboard center disc 27 is substantially less than the diameter of the circles of contact 23. This leaves a radial distance between the peripheral edge 28 of the cardboard and and the contact circles. It is an important feature of the present method that the resulting void 29 formed in such radial gap is filled not only by the small amount of radial-outward extrusion of plastic from between grooved portions 19 of the matrices, but also by radial-inward extrusion of plastic caused by inclined regions 21 of rims 22. When the dies close from the FIG. 1 position to the FIG. 2 position, the resin sheets are substantially pinched off at the circles of contact 23. This causes, in combination with the inwardly-divergent inclined rim regions 21, a radial-inward flow of the resin which is inwardly adjacent contact circles 23 to aid in filling void 29.

The diameter of cardboard disc 27 is correlated to the shapes of rim regions 21, to the cardboard thickness, to the resin thickness, and to the mold cavity depth, in such manner that void 29 will be filled. As an example, if the finished record thickness is 0.070 inch, if each resin sheet 26 is 0.020 inch in thickness, and if disc 27 is 0.040 inch in thickness, so that the 0.010 inch "differential" is provided, then disc 27 should have a diameter of about $11^{11}/_{16}$ inch plus or minus $^{1}/_{16}$ inch. This assumes that contact circles 23 are about 12 inches in diameter.

The matrix rims 22 insure that there will be a proper seal radially outwardly of the cardboard edge 28. The presence of a properly sealed edge is very important. The edge must be smooth, must be manufactured in such manner that an adequate lead-in groove may be molded therein, must be such as to prevent delamination, must be such as to facilitate trimming, and must insure against entrance of moisture into the cardboard center. It is to be understood that, if the cardboard center becomes moist, it will swell and ruin the record.

Because the contact circles 23 come substantially together about substantially 360 degrees when the mold is in the closed position, there is very little plastic connecting the extreme edge portions of sheets 26 to the portions radially inwardly of the circles 23. Therefore, it is a very simple matter to effect trimming after the record is removed from the press, and such trimming results in properly formed smooth edges as desired. This is to be contrasted with the situation which would occur if there were no substantially-contacting edges, since the glass-clear material forming the surface regions of the record may not be trimmed by shearing. Any attempt to shear resin which had not previously been substantially pinched off would result in shattering or fracture of the resin.

The resin and cardboard sheets are formed with center holes adapted to receive pin 16 for registry purposes.

Proceeding next to a description of the manner of forming a phonograph record by use of the indicated matrix sections 13 and 14, and the indicated sheets 26 and 27 of resin and cardboard, the resin sheets are first preheated to a temperature on the order of 180 degrees F. Also, the mold is preheated (by passing steam through passages 12) to a temperature in the range of about 250 degrees F. to about 270 degrees F.

The lower resin sheet is placed on the lower matrix section 14, with the central hole in the resin sheet registered with bore 17. The cardboard center or core 27 is then placed over the lower resin sheet and with the central hole again registered, following which the preheated upper resin sheet is positioned over the cardboard center (as shown in FIG. 1), with the center opening registered. Any slight misalignment between the sheets is corrected by the pin 16 when it passes downwardly in response to closing of the press.

The mold is then closed to the position of FIG. 2, and molding pressure on the order of 2,500 pounds per square inch is applied (the dies being maintained heated to the indicated temperature in the range of about 250 degrees F. to about 270 degrees F.) during continuance of the molding pressure. Such pressure-temperature is maintained applied for a period of about 30 or 40 seconds. Thereafter, the passage of steam through passages 12 is discontinued and water is passed therethrough to cool the mold to a temperature in the range of about 100–125 degrees F. The pressure is then released, the mold opened to the position of FIG. 1, the record is removed and any excess is trimmed from the periphery thereof as indicated above. The over-all molding cycle may be on the order of approximately one minute.

The indicated temperatures and pressures are higher than is conventional in the record-pressing industry. However, pressures (and, within limits, temperatures) greater than those specified herein may be employed in order to decrease molding time.

The preheating of the resin sheets may be on a steam table, in an oven, or in special ovens such as are employed for "shrink-wrap" materials.

It is to be noted that the resin sheets 26 not only bond and seal to each other (at the edge regions outwardly of cardboard edge 28), but they also bond to the printed surfaces of the cardboard disc.

The record press may also be of a type in which the matrix or stamper terminates inwardly of the rim means, which rim means is then a separate element having a contact circle corresponding to 23, and an inclined surface corresponding to 21.

We claim:
1. A method of manufacturing a picture-type phonograph record, which comprises:
   providing a sandwich formed of corresponding outer sheets of clear thermoplastic synthetic resin and a smaller-diameter central disc consisting of printed cardboard, whereby the edge portions of said outer sheets extend radially outwardly past the edge of said central disc, and
   effecting heat and pressure molding of said sandwich in phonograph record-stamper means having peripheral rim portions and which are so constructed and related to the thicknesses of said resin sheets and of said cardboard disc that:
      the grooves of said record-stamper means are filled, and
      there is sufficiently little radial-outward flow of said resin that rupture of said cardboard is prevented, and
      said edge portions of said outer sheets are bonded and sealed together radially outwardly of said central disc edge, and
      the thickness of said sandwich prior to molding thereof is 0.010 inch, plus or minus about 0.003 inch, thicker than the thickness of the molded record,
         said 0.010 inch differential being adequate to properly fill the grooves in the record-stamper means, but insufficiently great to result in excessive radially-outward flow of resin during said molding.

2. The invention as claimed in claim 1, in which said method further comprises employing record-stamper means the central regions of which lie substantially in the same planes as do the respective grooved regions thereof, whereby the molding pressure present at the central regions of said sandwich will be generally equal to the pressure present at the grooved regions radially outwardly of said central regions.

3. The invention as claimed in claim 1, in which the thickness of each of said resin sheets is in the range of about 0.020 inch to about 0.025 inch.

4. The invention as claimed in claim 3, in which the resin forming said sheets is clear polyvinylchloride acetate resin.

5. The invention as claimed in claim 1, in which the thickness of said printed cardboard is in the range of about 0.015 inch to about 0.040 inch.

6. The invention as claimed in claim 1, in which said method comprises preheating said resin sheets to a temperature on the order of 180 degrees F., heating said record-stamper means to a temperature in the range of about 250 degrees F. to about 270 degrees F., effecting said molding at a pressure of at least about 2,500 pounds per square inch, and cooling said record-stamper means prior to release of the molding pressure.

7. The invention as claimed in claim 1, in which said method further comprises employing record-stamper means the rim portions of which are adapted to come close together at circles of contact, to thus pinch off said resin sheets during said molding step, the diameters of said circles of contact being substantially larger than that of said central disc.

8. The invention as claimed in claim 7, in which the portions of said record-stamper means inwardly adjacent said circles of contact thereof are shaped to effect substantial radially-inward flow of said resin during said pinching-off of said resin sheets.

9. A method of manufacturing a picture-type phonograph record, which comprises:
providing a record-forming press having corresponding upper and lower stamper means which include grooved portions and which have corresponding circular rim portions adapted to substantially meet each other at circles of rim contact when the press is closed,
said rim portions having radially-inwardly divergent inclined sections located radially inwardly of said circles of rim contact,
said stamper means having center portions which are respectively substantially coplanar with said grooved portions whereby the central region of the resulting record has substantially the same thickness as does the grooved region of such record,
disposing coaxially in said press a sandwich comprising corresponding outer sheets of clear thermoplastic synthetic resin and a smaller-diameter central disc consisting of decoratively printed cardboard,
the edge portions of said outer sheets extending radially outwardly past the edge of said central disc, and at least substantially to said circles of rim contact,
said edge of said central disc being substantially smaller in diameter than are said circles of rim contact,
effecting heat and pressure molding of said sandwich by said record-forming press,
said molding including bringing said stamper means together until said rim portions are closely adjacent each other at said circles of rim contact,
said bringing of said stamper means together effecting radial-inward flow of said resin from said circles of rim contact toward said edge of said central disc, to thus aid in filling with resin the void adjacent said edge of said central disc, and
relating the combined thicknesses of said outer sheets and of said central disc to the depth of the mold cavity when said stamper means are together, in such manner that the thickness of said sandwich prior to said molding is 0.010 inch, plus or minus 0.003 inch, greater than the thickness of said sandwich subsequent to said molding.

10. The invention as claimed in claim 9, in which the diameter of said circles of rim contact is approximately 12 inches, and in which the diameter of said edge of said central disc is 11 11/16 inches plus or minus about 1/16 inch.

11. The invention as claimed in claim 9, in which the thickness of said cardboard is in the range of 0.015 inch to about 0.040 inch.

12. The invention as claimed in claim 9, in which the thickness of each of said resin sheets is in the range of about 0.020 inch to about 0.025 inch.

13. The invention as claimed in claim 9, in which said resin sheets are clear polyvinylchloride acetate resin, and in which said molding is effected at a temperature in the range of 250 degrees F. to 270 degrees F., and at a pressure of at least 2,500 pounds per square inch.

14. A method of manufacturing a picture-type phonograph record, which comprises:
providing a sandwich formed of corresponding outer sheets of clear thermoplastic synthetic resin and a smaller-diameter central disc consisting only of printed cardboard or printed paper-surfaced cardboard, as distinguished from metals and other materials,
the edge portions of said outer sheets extending radially outwardly past the edge of said central disc, and
effecting heat and pressure molding of said sandwich in record-stamper means having peripheral rim portions and which are so constructed and related to the thicknesses of said resin sheets and said cardboard disc that:
the grooves of said record-stamper means are filled, and
there is sufficiently little radial-outward flow of said resin that rupture of said cardboard is prevented, and
said edge portions of said outer sheets are bonded and sealed together radially outwardly of said central disc edge,
said heat and pressure molding being effected by: preheating said resin sheets to a temperature on the order of 180 degrees F.,
heating said record-stamper means to a temperature in the range of about 250 degrees F. to about 270 degrees F.,
effecting said molding at a pressure of at least about 2,500 pounds per square inch, and cooling said record-stamper means prior to release of the molding pressure.

References Cited

UNITED STATES PATENTS

| | | | |
|---|---|---|---|
| 2,364,870 | 12/1944 | Otto | 264—320X |
| 2,772,888 | 12/1956 | Doncaster | 264—107X |
| 3,247,298 | 4/1966 | Utiger | 264—322X |
| 3,466,214 | 9/1969 | Polk | 264—163X |

FOREIGN PATENTS

| | | | |
|---|---|---|---|
| 85,318 | 1936 | Sweden | 264—107 |

ROBERT F. WHITE, Primary Examiner

R. R. KUCIA, Assistant Examiner

U.S. Cl. X.R.

264—163, 322